United States Patent [19]

Zahn

[11] 4,174,806
[45] Nov. 20, 1979

[54] RECORDING DEVICE FOR THE DISPENSING OF GOODS

[76] Inventor: Ulrich Zahn, Bollstrasse 32, 3076 Worb, Switzerland

[21] Appl. No.: 930,342

[22] Filed: Aug. 2, 1978

[51] Int. Cl.$^2$ ............................................. G07F 7/08
[52] U.S. Cl. .................................................... 235/381
[58] Field of Search ........................................ 235/381

[56] References Cited

U.S. PATENT DOCUMENTS

| 2,792,148 | 5/1957 | Goldenberg | 235/381 |
| 3,644,713 | 2/1972 | Hayakawa et al. | 235/381 |
| 3,688,085 | 8/1972 | Tetar | 235/381 |
| 3,931,497 | 1/1976 | Gentile et al. | 235/381 |
| 4,085,313 | 4/1978 | Van Ness | 235/381 |

*Primary Examiner*—Daryl W. Cook
*Attorney, Agent, or Firm*—Brady, O'Boyle & Gates

[57] ABSTRACT

The invention relates to a recording device for the dispensing of goods, especially liquid automotive fuel, comprising a scanning or reading device for information carriers serving as credit cards, bearing customer identification numbers individually correlated with the customers; at least one dispensing unit which is blocked in the rest condition, is unblocked by the reading device after reading one of these customer ID numbers, and generates counting pulses during the dispensing of the goods, each of these pulses corresponding to a predetermined counting unit of the quantity of goods or to a corresponding price unit; a pulse counter counting, respectively starting with zero, the thus-produced counting pulses upon each dispensing of goods; and a recording device which records the thus-counted pulses, respectively together with the customer ID number scanned by the scanning or reading device, continuously on a record carrier.

2 Claims, 1 Drawing Figure

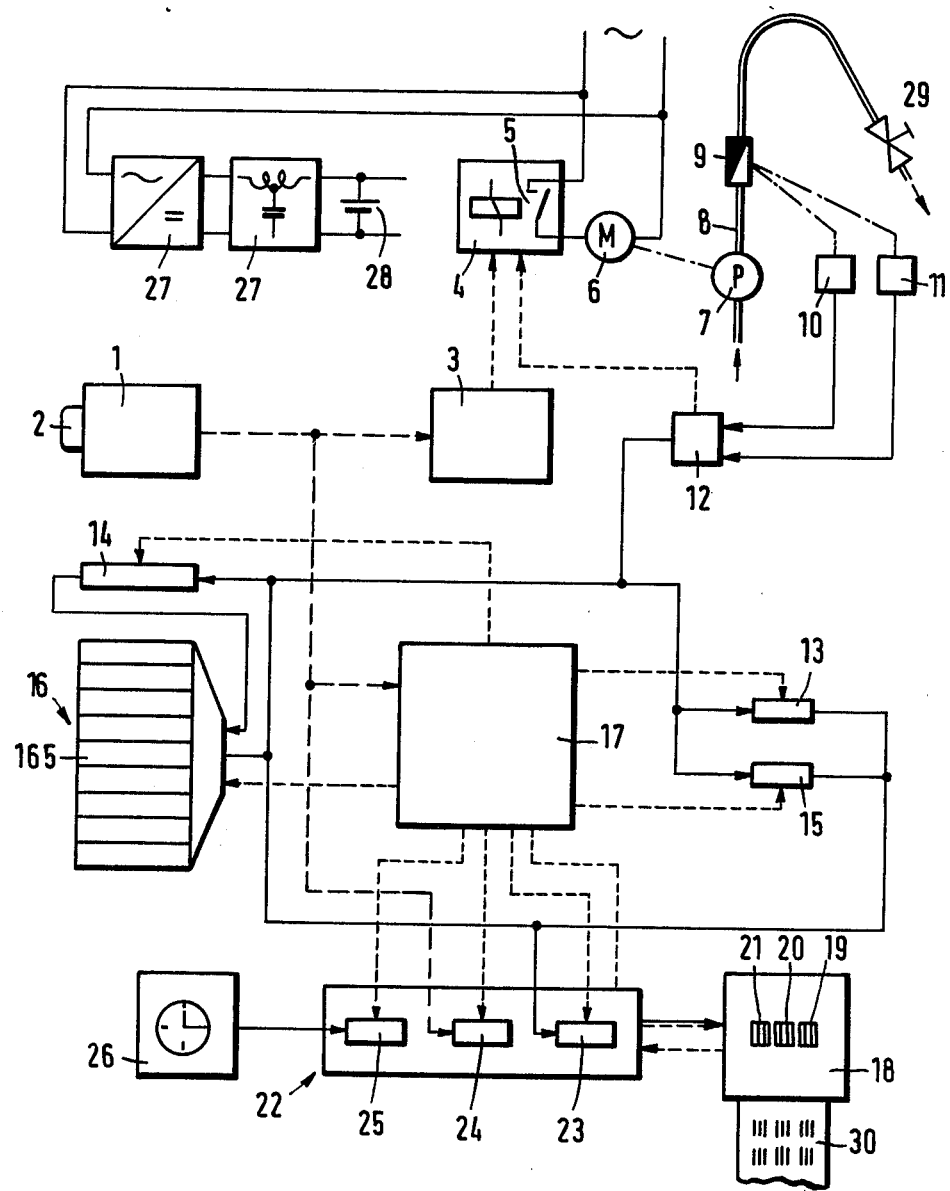

RECORDING DEVICE FOR THE DISPENSING OF GOODS

In conventional devices of this type for the dispensing of liquid automotive fuel (called gasoline for short hereinbelow), the accounting for the customers is effected, for example monthly, on the basis of the recorded data. It is necessary for this purpose to add up all counted units for each customer ID number, i.e. for each customer. These devices exhibit the advantage of an individual recording of all gasoline purchases customarily furthermore supplemented by the respective recorded date. This advantage is faced by the disadvantage that the individual purchases of each customer must be added up.

Furthermore, systems of a different type for dispensing gasoline are known which do not contain a recording device but rather have an electromagnetic counter for each customer ID number. The reading device, after reading a customer ID number, connects the associated counter to the pulse output of the dispensing device. To render customer accounting, the counters are read off, the counter reading is compared to the counter reading read off during the previous accounting, and the difference is charged to the customer. These devices exhibit the advantage that the individual purchases of goods have already been added up by the counters. There is, however, the disadvantage that in each case the difference of the counter readings must be produced, and one can no longer determine the individual purchases resulting in the counted totals.

Furthermore, errors during the reading of the counter data upon accounting and of the counter reading effected during the previous read-off cannot be checked, either. Although such errors will be compensated for during the subsequent accounting, if a correctly read-off counter reading is the basis therefor, this is unsatisfactory to the customer, and error compensation will not at all occur if the customer no longer purchases gasoline after the erroneous reading. The calculation of the difference between the last and penultimate counter readings would be eliminated, it is true, if the counters were to be set respectively to zero after each reading. However, in such a case, reading errors could not at all be compensated for any more.

Another difference residing in the devices of these two kinds lies in the technical expenditure for the recording device, on the one hand, and the counters, on the other hand. Due to this expenditure, the practice has been, with a number of customers which is not too large (for example up to 100), to provide one counter per customer and, in case of a larger quantity of customers (e.g. up to 10,000), one recording device for all customers together. In this way, the respective advantages of the particular type of device were utilized, while unavoidably tolerating the disadvantages thereof.

The invention is based on the problem of fashioning a device of the type mentioned in the foregoing so that the accounting can be rendered even more simply than in either of the devices of the two known types, and the technical expenditure depends only to an insubstantial degree on the number of customers.

In order to solve this problem, the device of this invention comprises a long-term storage means containing for each customer ID number a storage cell individually associated with this ID number, and a control circuit which upon each dispensation of goods effects a transfer of the content of the storage cell associated with the customer ID number scanned or read by the scanning or reading device into a second counter, the addition of the counting pulses produced by the dispensing device to the content of this storage cell transferred into the second counter, and the transmission of the thus-obtained counter reading into this storage cell, which control circuit blocks the scanning or reading device upon a control command, and thereafter triggers a directly successive recording of the content of each individual storage cell, respectively together with the associated customer ID number, and thereafter initiates the unblocking of the scanning or reading device.

The advantages attained by means of the invention reside particularly in that there is a recording for each customer ID number of the sum total of the quantities of goods purchased and/or the corresponding price units, as well as their individual addends (optionally with reference date); and that for the formation of all these sum totals only the single second counter is required, and for each customer ID number only one storage cell is necessary.

As one example for the invention, a recording device for a gasoline station will be described hereinbelow in greater detail with reference to the appended drawing. The single FIGURE shows a block diagram of the parts of the example essential in connection with this invention. In this diagram, current supply lines are indicated by full lines without arrow tips, while all other lines are shown by lines with arrow tips, namely counting pulse lines and one line for timing pulses in a solid line; lines conducting the signal corresponding to the customer ID number in long dashes; and control lines in short dashes.

The device has a reading unit 1 for customer ID numbers of credit cards (one such card is denoted by 2) which respectively characterize an individual customer and for a symbol for the respective gasoline station provided on these credit cards, excluding the use of credit cards not intended for this gasoline station. The read-off customer ID number is, if the card bears the symbol, transferred to a test circuit 3 wherein the customer ID numbers of credit cards are stored which no longer afford the right to purchase gasoline, e.g. credit cards reported lost by customers, or credit cards owned by customers no longer in good credit standing. Once the test circuit 3 determines that the read-off customer ID number does not pertain to such customer ID numbers, it transmits a control current to a relay circuit 4, whereby an operating current relay 5 is excited in the circuit of the drive motor 6 for the gasoline pump 7 of the gasoline dispensing station, not shown. This control current flows as long as the card 2 remains in the reading device 1. During this time, gasoline can be withdrawn.

The arithmetic unit of the flowmeter 9 connected in series with the pump 7 in the gasoline line 8 of the gasoline dispensing station is positively connected with a counting pulse generator 10, 11, present as a twin unit to increase the reliability of the determination of the amounts of gasoline dispensed (and/or of the corresponding price units) (these connections are in dot-dash lines in the drawing). Each of the two pulse generators 10 and 11 yields one pulse per counting unit. Each pulse can correspond, for example, to 0.1 liter of gasoline or to an amount of gasoline pertaining to the amount of Swiss Francs 0.10. The pulses of the two counters 10 and 11 are transmitted via separate lines to a counting pulse test circuit 12. The latter concludes, from a conformance of the two pulse sequences, that the data are correct and in this case transmits one pulse per counting unit (0.1 liter or 0.10 Swiss Francs) to a first, second and third counter 13, 14, and 15, respectively. As will be explained in greater detail below, the first counter 13 counts the pulses with each purchase respectively starting with zero; the second counter 14 cooperates with a storage unit 16 wherein a control circuit 17 centrally correlated to the entire device controls this cooperation; the third counter 15 counts the pulses in case of all purchases in continuous succession.

The storage unit 16 has, for each customer ID number, one storage cell, for example storage cell 165 for the customer ID number of credit card 2.

A tape printer 18 has number wheels 19, 20, 21 for the respectively combined printout of the counter reading of one of the counters 13 and 15 or of the content of a storage cell of storage unit 16, a customer ID number, and a date. These number wheels 19, 20, 21 (of which only respectively three are indicated), just as the printing procedure, are controlled by a printer control circuit 22 which latter, in turn, is controlled by the central control circuit 17. In place of the printer 18, it is also possible to utilize a recording device of some other type, for example a tape punch or a magnetic recording device. Suitably, a recording method is employed which corresponds to the regulations of commercial accounting.

The printer control circuit 22 contains a first, second, and third register 23, 24, and 25, controlled by the central control circuit 17, for setting the number wheels 19, 20, and 21, respectively. The level of counter 13 or of counter 15 of the content of each individual cell of the storage unit 16 can be transferred into the first register 23. The second register 24 contains the customer ID number of the credit card 2 read off by the reader 1. The third register 25 receives timing pulses from a date clock 26. Registers 23, 24, and 25 serve as buffer storage means; they make it possible to transmit the information stored therein to the printer 18 at the slow stepwise rate necessary for the setting of the number wheels 19, 20, 21. The printer triggers, after each setting step, the respectively subsequent setting step by means of a control pulse transmitted to the printer control circuit 22.

The device is fed from a mains supply unit 27, in a way not illustrated in detail. In this connection, a buffer battery 28 is provided, the capacity of which is sufficient to operate the pulse generator 10, 11 and the circuits which transmit the pulses, during the running-out period of the pump 7, to drive the registers 19, 20, 21 and the printer 18 until a running printing step is terminated, but to operate the counters 13, 14, 15 and the storage cells of storage unit 16 for a substantially longer period of time ranging above the longest current interruption of the supply AC voltage determined by experience.

The mode of operation of the device described herein is as follows:

The customer ID number read by the reading device 1 is transmitted into the test circuit 3 as well as into the central control circuit 17 and into the second register 24. The test circuit 3 (if the ID number entitles the customer to purchase gasoline) activates the gasoline pump motor 6 by means of the relay circuit 4. The control circuit 17 effects a transfer of the content of storage cell 165, associated with the read-off customer ID number, into the second counter 14 (set to zero).

Once the customer, after inserting his credit card 2 in the reading device, opens the filling valve 29 of the gasoline pump station, the gasoline flow drives the flowmeter 9 and the pulse generator 10, 11, of twin construction, positively coupled with the arithmetic unit of this flowmeter, transmits two counting pulse sequences to the counting pulse test circuit 12. The latter transmits, upon coincidence of the two counting pulse sequences, a counting pulse sequence corresponding thereto to the counters 13, 14, and 15, while when there is no coincidence the counting pulse test circuit transmits an interference signal to the relay circuit 4 whereby the current of the pump motor 6 is interrupted and an acoustical and optical trouble signal (luminous writing) is produced (the signaling devices are not illustrated). The first counter 13 (as will be described below) has been set to zero after the preceding filling-up process, i.e. it counts the pulses starting with zero. The second counter 14 counts the pulses starting with the counter reading transferred from the storage cell 165. The third counter 15 continues counting in each case independently of the customer ID number. The filling-up process can be interrupted as desired by closing and reopening the filling valve 29, as long as the customer's card 2 is disposed in the reading device 1.

As soon as the customer's card 2 has been pulled out of the reading device 1, the relay circuit 4 opens the circuit of the pump motor 6, and the central control circuit 17 effects, after the above-mentioned delay period (running-out time for the pump 7), a transfer of the reading of the first counter 13 into the first register 23, and a zero setting of this counter; a transfer of the reading of the second counter 14 into the storage cell 165; and a transfer of the reading of the three registers 23, 24, 25 into the printer 18, whereupon the latter prints the date, the customer ID number, and the number of counting pulses (amount of gasoline or price units).

If the customer erroneously fails to pull out his credit card 2 within a predetermined time period from the reading device 1 after the filling valve 29 has been closed, he will be reminded by an acoustical and optical signal (luminous writing), and if the credit card 2 is then still in the reading device 1 after a further, predetermined time period, the reading device will automatically retain the card and convey same into a locked collection box to prevent the unauthorized usage of this card. The devices used for this purpose are known and are not illustrated herein.

In the manner described above, the printer 18 prints all gasoline purchases with date and customer ID number chronologically on the record tape 30. Furthermore, in storage unit 16, the individual purchases are separately added up for each customer ID number.

To render the accounting for the customers, the central control circuit 17 contains a program control circuit, the program of which can be triggered by a control command. In this program, the reading device 1 is first blocked; thereupon the contents of the storage cells of storage unit 16 are transferred one by one into the first register 23, and the associated customer ID number is in each case transferred into the second register 24 and printed out by printer 18, whereupon the contents of all storage cells are erased. Thereafter, the content of the third counter 15 is transferred into the first register 23, printed with date (but without a customer ID number), and this counter 15 is erased. Finally, the reading device 1 is unblocked again. The control command can be triggered manually or also by the date clock 26 at an instant to be set in this clock.

After the program has run its course, the record tape 30 shows a recording for each customer of not only the individual purchases (in each case with date) but also the total of all purchases made since the preceding accounting. Besides, in order to provide a control, the total of all purchases of all customers (third counter 15) is likewise recorded.

The program can also be conducted without erasing the contents of the storage cells. In this case, an intermediate result is obtained, to which the further purchases are then added.

If in the aforementioned program, wherein the contents of the storage cells are erased, the recording is made in price units, then the amounts charged can be read off directly from the record tape 30. If the recording is effected in a form readable by a reading device, then the bills can be written fully automatically by a data processing unit which in the recording of the quantities can also conduct the conversion into prices. Suitably, such a data processing unit is utilized for processing the record tapes of a larger number of gasoline stations.

The device of this invention can also be constructed for the selective dispensing of differing types of goods, in the present case of a gasoline station for the selective purchase of regular and high-test gasoline. In such an arrangement, by means of a settable selector or by means of an additional information provided on the credit card and to be read by the reading device, the indication "regular" or "high-test" is added to the customer ID number. This information serves to control a change-over switch (not shown) which switches over between the pump motor and the counting pulse generator, as well as the third counter of a gas pump for regular gasoline and the corresponding parts of a gas pump for high-test gasoline. The customer ID number is utilized together with this information, as described hereinabove for the customer ID number. Accordingly, the storage means has a storage cell for each combination of a customer ID number and this information. The information also passes into the second register and is printed out in each case together with the customer ID number.

What is claimed is:

1. Recording device for the dispensing of goods, especially liquid automative fuel, comprising
   a scanning or reading device (1) for information carriers (2) serving as credit cards, bearing customer identification numbers individually correlated with the customers;
   at least one dispensing unit (6, 7, 8, 29) for the goods, which is blocked in the rest condition and is unblocked by the reading device after reading one of these customer ID numbers;
   a pulse generator (9, 10, 11, 12) which generates counting pulses during the dispensing of the goods, each of these counting pulses corresponding to a predetermined counting unit of the quantity of goods or a corresponding price unit;
   a pulse counter (13) counting upon each dispensing of goods the thus-produced counting pulses, respectively starting with its zero setting; and
   a recording device (18) which records the thus-counted pulses, respectively together with the customer ID number scanned or read by the scanning or reading device, continuously on a record carrier (30), characterized by
   a long-term storage means (16) comprising for each customer ID number a storage cell (e.g. 165) individually associated with this ID number, and
   a control circuit (17, 22), which
   upon each dispensation of goods effect a transfer of the content of the storage cell (e.g. 165) associated with the customer ID number scanned or read by the scanning or reading device (1) into a second counter (14),
   the addition of the counting pulses produced by the pulse generator (9, 10, 11, 12) to the content of this storage cell (e.g. 165) transferred into the second counter (14), and
   the transmission of the thus-obtained counter reading (of counter 14) into this storage cell (e.g. 165), and
   triggers, upon a control command, a blocking of the scanning or reading device (1),
   thereafter triggers directly successive recordings of the content of the individual storage cells (of the long-term storage means 16), respectively together with the associated customer ID number, and
   then triggers the unblocking of the scanning or reading device (1).

2. Device according to claim 1, characterized in that the control circuit (17, 22), upon a different command,
   triggers the blocking of the scanning or reading device (1),
   thereafter triggers the directly successive recordings of the content of each individual cell (of the long-term storage means 16), respectively together with the associated customer ID number,
   then triggers an erasure of the contents of the storage cells (of the long-term storage means 16) and thereafter an unblocking of the scanning or reading device (1).

* * * * *